United States Patent
Whiteside et al.

[11] 3,729,040
[45] Apr. 24, 1973

[54] FLOATING REPLACEABLE ANCHOR NUT ASSEMBLY

[75] Inventors: Roger B. Whiteside, Cinnaminson, N.J.; William Cooper, Warminster, Pa.

[73] Assignee: Standard Pressed Steel Co., Jenkintown, Pa.

[22] Filed: May 26, 1971

[21] Appl. No.: 147,043

[52] U.S. Cl. ............................ 151/41.73, 151/41.76
[51] Int. Cl. .................................................. F16b 37/04
[58] Field of Search ......................... 151/41.7, 41.71, 151/41.73, 41.74, 41.75, 41.76, 69; 85/32 K; 287/103 A; 285/377, 362

[56] References Cited

UNITED STATES PATENTS

| | | | |
|---|---|---|---|
| 1,166,345 | 12/1915 | Gates | 151/41.7 |
| 1,734,996 | 11/1929 | Butler | 285/377 |
| 1,910,152 | 5/1933 | Durfey | 285/362 |
| 2,144,553 | 1/1939 | Simmonds | 151/41.76 |
| 2,304,107 | 12/1942 | Leisure | 151/41.76 |
| 2,511,396 | 6/1950 | Brekke | 285/377 |
| 3,180,387 | 4/1965 | Dzus et al. | 151/41.73 |
| 3,219,086 | 11/1965 | Zahodiakin | 151/41.76 |
| 3,443,617 | 5/1969 | Whiteside et al. | 151/41.73 |
| 3,461,937 | 8/1969 | Finney | 151/41.76 |

FOREIGN PATENTS OR APPLICATIONS

| | | | |
|---|---|---|---|
| 582,743 | 11/1946 | Great Britain | 85/32 K |

Primary Examiner—Marion Parsons, Jr.
Attorney—Andrew L. Ney and Curtis, Morris & Safford

[57] ABSTRACT

An anchor nut assembly wherein an internally threaded nut element is releasibly retained within a nut basket and is provided with a predetermined degree of radial float. The nut element is releasibly retained within the nut basket by a rotatable retaining ring member which in one position allows the nut to be readily removed or replaced within the nut basket and in a second position positively retains the nut element within the nut basket while permitting the nut element the desired degree of radial float within the nut basket.

10 Claims, 4 Drawing Figures

Patented April 24, 1973  3,729,040

INVENTOR.
ROGER B. WHITESIDE
WILLIAM COOPER
BY
Curtis, Morris & Safford
ATTORNEYS

FLOATING REPLACEABLE ANCHOR NUT ASSEMBLY

The present invention relates to anchor nut assemblies and more in particular to a floating anchor nut assembly wherein the anchor nut itself is readily replaceable.

There are many fastener applications wherein it is desired to provide a floating anchor nut assembly which allows for slight misalignment of the joint and wherein the nut element itself is positively retained within the assembly but can be replaced with a new nut when the nut becomes impaired because of repeated usage to a point where replacement with a new nut is desired. Present anchor nut assemblies have not been found completely satisfactory from the standpoint of ready replaceability without destroying the ability of the fastener assembly to positively retain the nut. Some of these prior art anchor nut assemblies retain the nut by tap members which are bent over an extending flange of the nut and, when it is desired to replace the nut, the tabs must be bent upwardly to remove the nut and bent downwardly again when a new nut is replaced in the assembly. Bending the retaining tabs in this manner often causes metal fatigue in the tab so that the tabs break off and destroy the retention feature of the assembly. In addition, it is often difficult to bend the retaining tabs upwardly to remove the nut, especially when the assembly is made of a high strength metal or alloy.

It is thus an object of the present invention to provide a floating anchor nut assembly wherein the anchor nut is readily replaceable.

It is another object of the present invention to provide an anchor nut assembly wherein the nut is provided with a predetermined degree of radial float and in which the nut is mounted within the nut assembly in such manner as to be readily replaceable without destroying the nut retention capability of the assembly.

It is a further object of the present invention to provide a floating anchor nut assembly including an anchor nut, a nut basket to receive the anchor nut and which is engageable with a plate member on which the nut assembly is to be mounted and a rotatable retaining ring cooperating with the nut basket and the nut element to positively retain the nut element within the nut basket while allowing a limited degree of radial float of the nut element within the nut basket.

These and other objects and advantages of the present invention will be more readily apparent after consideration of the following specification and accompanying drawing in which.

Figure 1:
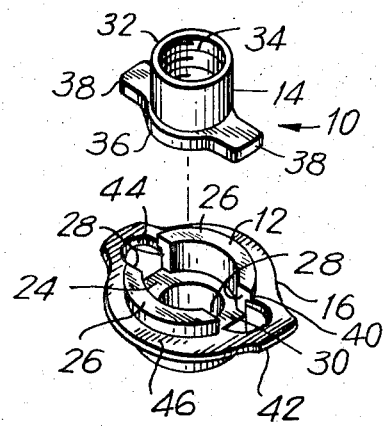
FIG. 1 is an exploded perspective view showing the nut element, the nut basket and the retaining ring.

With reference now to the drawing and particularly FIG. 1, the anchor nut assembly 10 of the present invention includes a nut basket 12 adapted to house a nut element 14 which is retained within the nut basket 12 by a retaining ring member 16 adapted to rotate with respect to the nut basket 12 to positively retain the nut element 14 therein.

Figure 3:
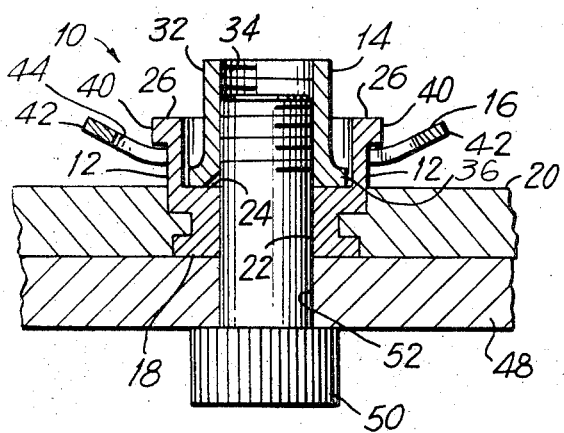
FIG. 3 is an elevational view taken on the line 3—3 of FIG. 2.
Figure 4:
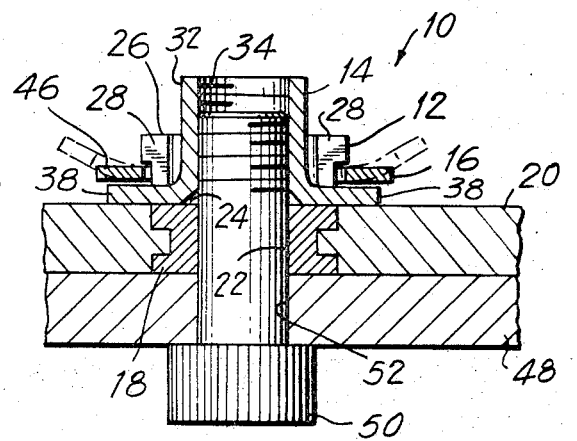
FIG. 4 is an elevational view taken on the line 4—4 of FIG. 2.

Referring now to FIGS. 3 and 4 as well, it is seen that the nut basket 12 includes a lower body portion 18 adapted to be engaged within a plate member or workpiece 20 within which the anchor nut assembly 10 is adapted to be mounted. Preferably, the lower body portion 18 of nut basket 12 comprises a press insert of the type shown in U. S. Pat. No. 3,443,617, but it is to be understood that nut basket 12 could be affixed to a plate member in any convenient fashion, for example as a threaded insert within the plate member. The nut basket 12 includes a bolt receiving aperture 22 therethrough and includes an annular nut seat 24 to accommodate nut element 14. Extending upwardly from the nut seat 24 are a pair of opposed arcuately shaped nut basket flanges 26 which provide a guide for seating of the nut 14 within the nut basket 12 and also provide a support for mounting the retaining ring member 16 on the nut basket 12.

The nut basket flanges 26 each terminate in spaced facing end wall portions 28 to provide a pair of diametrically opposed openings 30 adapted to accommodate extending tabs of the nut 14 in order to preclude rotation of the nut while seated in the nut basket 12.

The nut 14 used in conjunction with the anchor nut assembly of the present invention includes a cylindrical segment 32 internally threaded as at 34 to receive a threaded end of a bolt or screw member and a flanged lower portion 36 provided with diammetrically opposed extending tab members 38. The flanged lower portion 36 of nut 14 is adapted to seat on the annular seating surface 24 in nut basket 12 and the opposed tab members 38 fit within the opposed openings 30 of the nut basket 12. Sufficient clearance is provided between the flanged portions 36 and tab members 38 of nut element 14 and the nut basket to permit a degree of radial movement or float of the nut within the nut basket 12 to accommodate slight misalignment in the joint assembly in which the anchor nut is employed. The extending tab members 38 cooperate with the end wall portions 28 of the nut basket flanges 26 to prevent appreciable rotation of the nut 14 when it is seated within the nut basket 12.

The retaining ring 16 is rotatably mounted about the nut basket flanges 26 and is preferably installed about the nut basket 12 prior to installation of the anchor nut assembly 10 in a panel member 20. After the nut basket has been suitably installed in the workpiece or panel, the ring 16 is retained about the nut basket 12 and is restrained between the surface of the panel 20 and a protruding lip segment 40 of the nut basket flanges 26.

Figure 2:
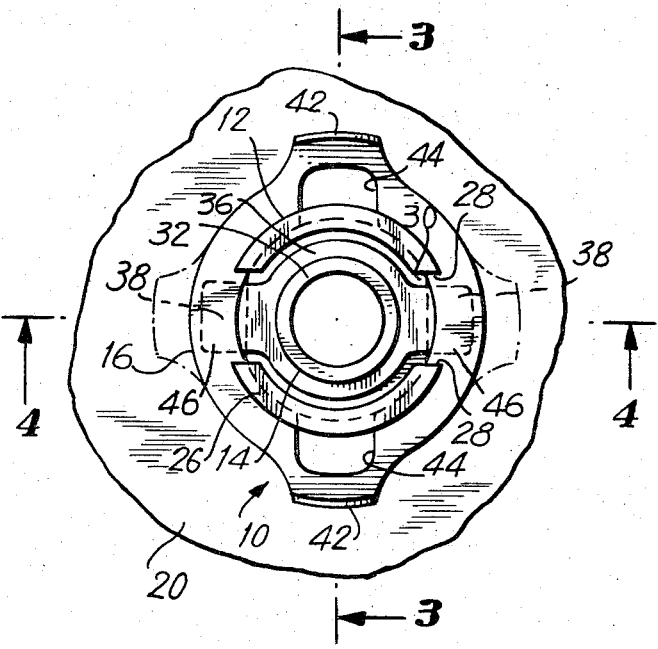
FIG. 2 is a top plan view of the anchor nut assembly installed in a workpiece.

The ring 16 includes a pair of arcuate segments 46 interconnected by diammetrically opposed extending tab portions 42 which are inclined upwardly to facilitate engagement with an appropriate turning tool. Each of the tab portions 42 includes cutout portions 44 to accommodate the extending tabs 38 on the nut element 14. Ring 16 is rotatable about the nut basket 12 from a first position where the cutouts 44 are in register with the opening 30 in the nut basket to a second position offset 90° with respect to the first position. When the ring is in the first position the nut element can be readily removed or replaced within the nut basket as its extending tabs 38 pass through the cutouts 44 of the ring 16. When the ring is rotated 90°, the intermediate arcuate segments 46 of the ring 16 are over the openings 30 in the nut basket and positively retain the nut element 14 therein because the segments 46 of the ring 16 now interfere with and obstruct the passage of the tab portions 38 of the nut. Thus, the segments 46 of ring 16 restrain the removal of nut element 14 from the nut basket 12. As best seen in FIG. 2, when the ring member 16 is in the position shown in broken line the nut element 14 can be readily removed from the nut basket for replacement and, after a new nut is placed in the nut basket, and the ring rotated to the position shown in solid line, it is seen that the nut element is now positively retained within the anchor nut assembly.

In a joint assembly using the floating anchor nut assembly of the present invention, as best seen in FIGS. 3 and 4, the plate member 20 with the anchor nut assembly including the nut basket 12 retaining ring 16 and nut element 14 already installed is joined to a plate member 48 by a bolt or machine screw 50 which passes through a bolt receiving aperture 52 in plate member 48 through the bolt receiving aperture 22 in nut basket 12 and threadedly engaged within the threaded portion 34 of nut 14. Because the nut 14 is free to float radially to a certain degree within the nut basket 12, the floating nut is able to accommodate slight misalignment between the bolt receiving aperture 22 in the plate 48 and the bolt receiving aperture 22 in nut basket 12. As noted above, when it is desired to replace the nut element 14 ring 16 is rotated until the cutouts 44 of ring 16 are in register with openings 30 of nut basket 12 to provide clearance for tab elements 38 of the nut 14 to pass through the cutouts 44. After a new nut is installed, ring 16 is again rotated to place segments 46 of the ring over openings 30 to retain the nut element within the nut basket.

Ring member 16 is preferably made in a slightly ovalized condition with the minor diameter of the ring being across the segments 46. When the ring is in the full line position shown in FIG. 2, the minor diameter of the ring oval registers with the openings 30 of the nut basket flanges 26. Thus, when the ring is in this position, the ring has a small degree of arcuate play. When the ring is rotated to the broken line position shown in FIG. 2, there is a slight interference fit between the ring and the outside of the nut basket until the ring reaches the broken line position with the cutouts 44 in register with openings 30 where the ring snaps into position and is held to facilitate removal and insertion of a new nut element.

It is thus seen that the present invention provides a floating anchor nut assembly wherein the nut element is positively retained within the assembly and where the nut element is readily replaceable without destroying the structural integrity of the nut assembly or the joint.

What is claimed is:

1. An anchor nut assembly comprising:
   a nut element including an internally threaded segment adapted to engage a threaded bolt and at least one projecting tab segment extending radially outwardly from said threaded segment,
   a nut basket including a first body portion adapted to be attached to a plate member and a second body portion having axially projecting flange means forming a seat for said nut element, said flange means having axially extending slot means formed therein with a closed end adjacent said seat, said slot means being adopted to receive said tab segment to restrain said nut element from rotation within said nut basket, said flange means having a free end including a radially outwardly extending lip,
   retaining means rotatably positioned about the outer periphery of said flanges means intermediate said closed end of said slot means and said radial lip whereby said retaining means is retained about said flange means and does not interfere with radial movement of said nut element,
   said retaining means comprising a ring member adapted to be rotated relative to said nut basket between a retaining position and a removal position for said nut element, said ring member including a first segment which when positioned over said tab segment on said nut element retains said nut element in said nut basket against axial removal and a second segment provided with a passage which when positioned over said tab segment allows the ready removal of said nut element from said nut basket without removing said ring member from the periphery of said flange means and constitutes the removal position.

2. An anchor nut assembly as recited in claim 1 wherein said first segment of said ring member comprises an arcuately shaped portion and said second segment of said ring member comprises an extending tab portion having a cutout therein to provide sufficient clearance to pass said nut element and said projecting tab segment therethrough.

3. An anchor nut assembly as recited in claim 1 wherein said first body portion is a press insert adapted to be secured within the plate member.

4. An anchor nut assembly as recited in claim 1 wherein said flange means are spaced from said nut element to provide a clearance between said flange means and said nut element to provide a limited degree of radial movement for said nut element with said nut basket.

5. An anchor nut assembly as recited in claim 1 wherein said ring member includes means for restraining rotation of said ring member relative to said flange means.

6. An anchor nut assembly as recited in claim 2 wherein said ring member is slightly oval in shape with the minor diameter of said oval being across said first segment to restrain rotation of said ring member when said ring member is positioned to allow removal of said nut element from said nut basket.

7. An anchor nut assembly as recited in claim 1 wherein said nut element comprises a cylindrical body portion from which a plurality of tab segments extend in a radial direction, and wherein said nut basket includes a bolt receiving aperture extending therethrough and in generally aligned relationship with said internally threaded portion of said nut element and wherein said flange means comprises a pair of arcuately shaped projecting flanges including spaced opposed end wall surfaces defining said slot means.

8. In a joint assembly comprising at least two plate members joined together,
   an anchor nut assembly secured to one of said plate members, said anchor nut assembly comprising a nut element, a nut basket in which said nut element is seated and a retaining ring to retain said nut element within said nut basket, said nut basket having a lower body portion secured within said one plate member and an upper body portion including an annular nut seat and upstanding nut basket flanges defining a nut element receiving cavity, said basket flanges having a free end from which a lip projects in a radially outwardly direction.

a bolt member securing the other of said plate members to said one plate member and passing through said plate members to be threadedly engaged within said nut element, said nut element including a pair of extending tab elements cooperating with axially extending tab receiving openings formed between said nut basket flanges to preclude rotation of said nut within said nut basket, and said retaining ring being carried about said basket flanges, said retaining ring being located between the closed end of said tab receiving openings and said lip projecting from said basket flanges, said retaining ring including a passage and being rotatable between a first position wherein said ring obstructs said tab receiving openings to retain said nut element within said nut basket and a second position wherein said passage is aligned with at least one of said tab receiving openings when said nut element is to be removed from said nut basket.

9. A joint assembly as recited in claim 8 wherein said retaining ring is slightly oval in shape for restraining rotation of said ring member when said member is in said second position.

10. A joint assembly as defined in claim 18 wherein said ring includes a pair of arcuate segments interconnected by an extending tab segment and wherein each said tab segment includes a cutout portion therein to provide sufficient clearance for the passage therethrough of the tab elements of said nut element.

* * * * *